Nov. 12, 1968   C. S. WOODSON ET AL   3,410,932

POLYMER FOAMING

Filed Feb. 21, 1966

INVENTORS
C. S. WOODSON
W. E. COOPER
BY Young & Quigg
ATTORNEYS

United States Patent Office 3,410,932
Patented Nov. 12, 1968

3,410,932
POLYMER FOAMING
Charles S. Woodson and Wayne E. Cooper, Bartlesville, Okla., assignors to Phillips Petroleum Company, a corporation of Delaware
Filed Feb. 21, 1966, Ser. No. 528,874
10 Claims. (Cl. 264—45)

This invention relates to a method for making foamed polymer coated articles which have a substantially nonporous outer surface.

Heretofore metal containing articles such as wire have been coated with prefoamed polymer and then heated at least on the surface thereof to cause melting of the surface of the coating polymer and thereby form a foamed polymer coated article having a substantially nonporous outer surface.

It has now been found that a heating step separate from that which causes foaming of the polymer can be omitted and a coated article having a substantially nonporous outer surface still formed by coating the article with a mixture of at least one coating polymer and at least one foaming agent and then selectively heating the coated article itself to cause activation of the foaming agent by heat emitted from the article itself. By this method only foaming agent below the outer surface of the polymer coating is activated and the article is thereby formed by a single heating step.

Several advantages are realized from this invention, a few of which include the facts that the extruder or other apparatus used to form the coated product no longer need be raised to an elevated temperature and pressure in order to cause foaming of the coating polymer thereby saving wear and tear as well as operating costs of this apparatus, that the outer surface of the final product is nonporous and thereby protects the coated article from vapor, liquid, and the like that would otherwise penetrate a completely foamed polymer coating, and that the outer surface of the polymer coating is maintained cooler and therefore stronger and more resistant to pressure than the interior so that an increased amount of foaming agent can be employed without risk of uncontrolled foaming which could cause apertures in the surface of the coating polymer. This last advantage allows for more extensive foaming in the interior portion of the coating polymer than is possible when heating of the surface of the coating polymer is employed.

Accordingly, it is an object of this invention to provide a new and improved method for making foamed polymer coated articles having a substantially nonporous outer surface.

Other aspects, objects, and the several advantages of this invention will be apparent to those skilled in the art from the description, drawings, and appended claims.

Figure 1:
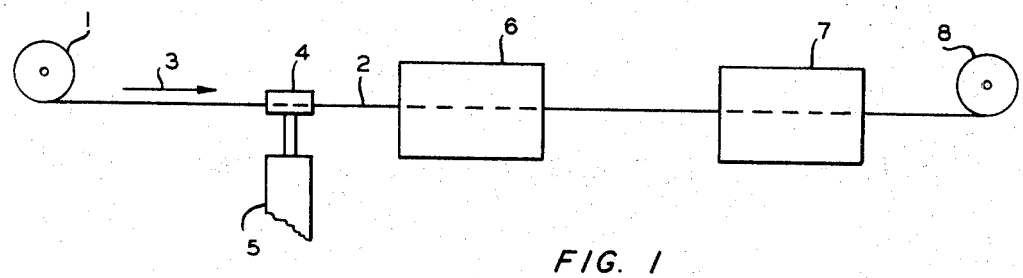

In FIGURE 1 there is shown a process embodying this invention.

Figure 2:
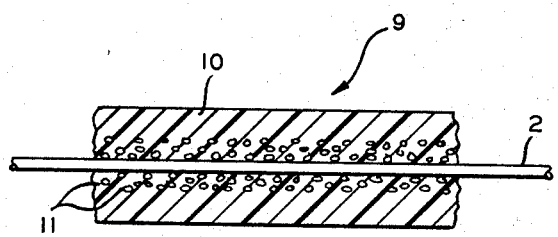

In FIGURE 2 there is shown a longitudinal cross section of a wire coated according to this invention.

In FIGURE 1 there is shown a supply roll 1 of metal wire 2 to be coated. The wire passes in the direction of arrow 3 through die head 4 of extruder 5 wherein a mixture of polymer and foaming agent is coated around the periphery of the wire. The coated wire then passes through a conventional induction heater 6 which selectively heats wire 2 and the heat that emanates from that wire causes activation of foaming agent in the coating polymer between the wire and the outer surface of the coating polymer. The wire then passes through a suitable cooling zone 7, e.g., a water bath at room temperature, and is collected on take-up roll 8.

In FIGURE 2 there is shown wire 2 having a polymer coating 9 which is composed of a substantially nonporous outer surface 10 and a foamed inner area 11.

Substantially any known and/or commercially available coating polymer which is capable of being foamed can be employed in this invention. Generally, any normally solid homopolymer, copolymer of two or more monomers, or mixtures of homopolymers and/or copolymers which can be frmed from one or more 1-olefins having from 2 to 8 carbon atoms per molecule, inclusive, can be used. Similarly, polyamides, polyesters, polyvinyl chloride, mixtures thereof and similar known coating polymers can be employed. Also, rubbery coating polymers formed from homopolymers of conjugated dienes containing from 4 to 10 carbon atoms per molecule, inclusive, and copolymers of one or more of these conjugated dienes with one or more monovinyl substituted aromatic compounds containing from 8 to 14 carbon atoms per molecule, inclusive, can be employed.

Examples of suitable polymers include homopolymers and copolymers of ethylene, propylene, butene-1, hexene-1, octene-1, butadiene, isoprene, piperylene, styrene, 3-methylstyrene, 1-vinylnaphthalene, and the like. Other polymers include nylons 6, 66, 610, and the like. Still other polymers can be made from glyptal (glycerol and phthalic anhydride). The polymeric ester of terephthalic acid with a dihydric alcohol, ethylene glycol, and the like can also be used. Also, other types of rubber such as silicone rubbers and the like can be employed.

All of these polymers are known, can be readily made by one skilled in the art, and most are commercially available. For example, the polyolefins can be prepared by polymerizing an olefin or olefins with known catalysts, particularly suitable catalyst being set forth in U.S. Patent 2,825,721, the disclosure of which is incorporated herein by reference. The polyamides can be made in a conventional manner by polycondensation reactions, e.g., the polycondensation of an aliphatic diamine and a dibasic acid or of caprolactam per se. Polyesters can be formed conventionally such as by reacting aliphatic or aromatic dibasic acids with aliphatic or aromatic diols (glycol). Rubbery homopolymers and copolymers of conjugated dienes and/or monovinyl substituted aromatic compounds can be formed using conventional catalysts such as butyllithium and the like.

The substrate to be coated can be any metal containing material capable of selective heating by inductive heating, electrical resistance heating, or similar known selective heating processes. Generally, the substrate will be heated to a temperature sufficiently elevated to heat the interior of the coating polymer to a temperature at or above the activation temperature of the foaming agent or agents in said polymer but below the temperature at which the thermal gradient through the thickness of the coating polymer causes at least one-half mil of the surface of the coating polymer to reach the activation temperature of the agent or agents present therein. The polymer coating can be sized during foaming thereof by any conventional method such as by using a sizing conduit.

Also, the coated substrate can be passed through a nonconductive cooling solution during the inductive heating step to further aid in preventing activation of the blowing agent in the outer surface of the coating.

The substrate can be coated with a polymer in any conventional method, presently preferred methods being melt extrusion or fluidized bed deposition of the mixture of polymer and foaming agent onto the substrate. Generally, any coating process can be employed so long as the temperature can be and is maintained substantially below the activation temperature of the foaming agent present in the polymer. Generally, the operating temperature of the coating process should be at least 5° F. below the activating temperature of the most easily activated foaming agent present in the polymer.

Generally, any type of known foaming agent susceptible to delayed activation can be employed. For example, liquid as well as solid foaming agents can be used. Particularly suitable foaming agents are solid materials that are thermally decomposable, e.g., azodicarbonamide (azobisformamide), barium azodicarboxylate, trihydrazino-sym-trazine, 4,4-'oxy-bis(benzenesulfonylsemicarbazide), p,p'-oxy-bis(benzenesulfonyl hydrazide), diazoaminobenzene, dinitrosopentamethylenetetramine, 4-nitrobenzene sulfonic acid hydrazide, beta-naphthalene sulfonic acid hydrazide, diphenyl-4,4'-di(sulfonylazide), and mixtures of materials such as sodium bicarbonate with a solid acid such as tartaric acid, fatty acids such as stearic acid and oleic acid, and the like.

The foaming agent and other conventional additives can be incorporated in the polymer in any known manner including wet or dry blending, solution mixing, coating particulate polymer with mineral oil and/or other known wetting agents and then coating the wetted polymer with powdered foaming agent, and the like. The amount of foaming agent employed will vary depending upon the material, conditions, and process used but will generally be that which is sufficient to produce a substantially interiorly foamed coating. Generally, the thickness of the foamed coating will also vary widely but will generally be in the range of from about 5 to about 500, preferably from about 20 to about 100, mils. Generally, the amount of foaming agent used will be in the range of from about 0.001 to about 10, preferably from about 0.2 to about 3, weight percent based on the total weight of the polymers to be foamed.

As is known in the art, other additives such as dispersants, promoters, retarders and stabilizers can be employed along with the above foaming agents. Promoters and retarders which decrease and increase, respectively, the temperature and other conditions at which the blowing agent decomposes include oxalic acid, lead acetate, cadmium amyl phosphite, ethanolamine, zinc laurate, zinc oxide, borax, aluminum stearate, and the like, as promoters and magnesium oxide, barium stearate, calcium carbonate, polyethylene glycol monolaureate, silicone oil, and the like as retarders. Dispersants which aid in dispersing the foaming agent in the polymer include mineral oil, glycerin, polyethylene glycol, propylene glycol, di-2-ethylhexylphthalate, low molecular weight polyisobutylene and the like. Conventional thermal and ultraviolet stabilizers of the organic and inorganic type such as inorganic metal salts and metallic esters can be employed as can other conventional additives such as fillers, pigments, antioxidants, and the like. Generally, the promoters, retarders, and dispersants are used in the range of from about 0.25 to about 5 parts per part of foaming agent.

EXAMPLE

A copolymer of ethylene and butene-1 containing about 2 weight percent butene-1 based on the total weight of ethylene and butene-1 in the copolymer, having a density of 0.947 gram per cubic centimeter at 25° C. (ASTM 1505–63T) and a melt index of 0.2 gram per 10 minutes (ASTM D1238–62T), and containing 0.5 weight percent azodicarbonamide based on the total weight of the copolymer to be foamed was applied by melt extrusion as a 30-mil thick coating over No. 14 AWG copper wire.

The melt extrusion was carried out at a temperature of about 320° F. to avoid activation of the azodicarbonamide.

The coated wire was then subjected to foaming by insertion into a 1¼ inch internal diameter induction coil formed from ¼ inch copper tubing of four turns and having a length of 2 inches. The coil was operated by a Toccoron induction heating machine manufactured by the Ohio Crankshaft Company, Cleveland, Ohio, with a 450 kilocycle, 15 kilowatt generator. The wire itself was heated by the induction coil to a temperature in the range of about 400° F. and the thermal gradient provided through the polymer coating by this heated wire caused foaming of the polymer through the interior of the coating but substantially below the outer surface of that coating. The resulting product exhibited a longitudinal cross section substantially the same as that shown in FIGURE 2.

Reasonable variations and modifications are possible within the scope of this disclosure without departing from the spirit and scope thereof.

We claim:

1. A method for making a foamed polymer-coated, metal-containing article having a substantially nonporous outer surface comprising coating a metal containing substrate with a mixture of at least one coating polymer and at least one foaming agent, and selectively heating said substrate to cause activation of said foaming agent by heat emanating from said substrate.

2. The method according to claim 1 wherein said substrate is a metal wire.

3. The method according to claim 1 wherein said selective heating is caused by inductive heating of said substrate.

4. The method according to claim 1 wherein said selective heating is caused by electrical resistance heating of said substrate.

5. The method according to claim 1 wherein said polymer is at least one of a plastic polymer and a rubbery polymer.

6. The method according to claim 5 wherein said plastic polymer is selected from the group consisting of homopolymers, copolymers, and mixture of homopolymers and/or copolymers formed from at least one 1-olefin having from 2 to 8 carbon atoms per molecule, inclusive, and polyamides; and said rubbery polymers are formed from homopolymers of conjugated dienes and copolymers of conjugated dienes with monovinyl substituted aromatic compounds.

7. The method according to claim 1 wherein said coating process is carried out by melt extrusion of said mixture at a temperature of at least 5° F. below the activation temperature of at least one foaming agent contained by said polymer.

8. The method according to claim 1 wherein said substrate is heated at a temperature such that the thermal gradient through the thickness of the coating polymer is sufficient to cause activation of foaming agent throughout the interior of said coating polymer but insufficient to cause activation of the foaming agent in at least a ½-mil thickness of the outer surface of said coating polymer.

9. The method according to claim 1 wherein said coating polymer is a copolymer of ethylene and butene-1, said copolymer contains from about 0.001 to about 10 weight percent based on the total weight of the copolymer of azodicarbonamide, the foaming agent containing copolymer is melt extruded onto said substrate at a temperature substantially below the activating temperature of said foaming agent, and the copolymer coating is foamed by inductive heating of said substrate so that a preponderance of the thermal gradient through the thickness of said coating copolymer is at least at the activation temperature of said foaming agent.

10. The method according to claim 1 wherein the coating polymer is formed from polyethylene and contains from about 0.001 to about 10 weight percent of at least one foaming agent based on the total weight of the polyethylene, the foaming agent containing homopolymer is melt extruded onto said substrate at a temperature substantially below the activating temperature of said foaming agent, and the homopolymer coating is foamed by inductive heating of said substrate so that a preponderance of the thermal gradient through the thickness of said coating homopolymer is at least at the activation temperature of said foaming agent.

No references cited.

JULIUS FROME, *Primary Examiner.*

L. M. GARRETT, *Assistant Examiner.*